United States Patent
Hibara et al.

(10) Patent No.: US 9,143,954 B2
(45) Date of Patent: Sep. 22, 2015

(54) POSITION IDENTIFICATION APPARATUS, POSITION IDENTIFICATION METHOD, POSITION IDENTIFICATION SYSTEM, RECORDING MEDIUM, AIR CONDITIONING SYSTEM, AND LIGHTING SYSTEM

(75) Inventors: Naoyuki Hibara, Tokyo (JP); Satoshi Minezawa, Tokyo (JP); Yoshiaki Koizumi, Tokyo (JP); Toshiyasu Higuma, Tokyo (JP); Noriyuki Kushiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 274 days.

(21) Appl. No.: 13/977,308

(22) PCT Filed: Jan. 31, 2011

(86) PCT No.: PCT/JP2011/051970
§ 371 (c)(1),
(2), (4) Date: Jun. 28, 2013

(87) PCT Pub. No.: WO2012/104983
PCT Pub. Date: Aug. 9, 2012

(65) Prior Publication Data
US 2013/0273936 A1    Oct. 17, 2013

(51) Int. Cl.
*H04W 24/00* (2009.01)
*G01S 5/02* (2010.01)
*H04W 64/00* (2009.01)

(52) U.S. Cl.
CPC ............... *H04W 24/00* (2013.01); *G01S 5/021* (2013.01); *G01S 5/0289* (2013.01); *H04W 64/00* (2013.01)

(58) Field of Classification Search
CPC ...... H04W 64/00; H04W 4/02; G01S 5/0252; G01S 5/02; H04L 29/08657
See application file for complete search history.

(56) References Cited

U.S. PATENT DOCUMENTS

2004/0072577 A1    4/2004 Myllymaki et al.
2008/0200181 A1*   8/2008 Zill et al. ................... 455/456.1
2010/0141531 A1*   6/2010 Nam et al. ..................... 342/451

FOREIGN PATENT DOCUMENTS

EP    2 189 803 A1    5/2010
JP    H11-178045 A    7/1999

(Continued)

OTHER PUBLICATIONS

Extended European Search Report issued Dec. 11, 2014 for the corresponding international application No. 11857712.1.
International Search Report of the International Searching Authority mailed Mar. 1, 2011 for the corresponding international application No. PCT/JP2011/051970 (with English translation).

*Primary Examiner* — Khalid Shaheed
*Assistant Examiner* — Shantell L Heiber
(74) *Attorney, Agent, or Firm* — Posz Law Group, PLC

(57) ABSTRACT

A locating apparatus comprises a first acquirer requesting multiple installed devices installed within a given space to radio-communicate with each other so as to acquire first radio communication information representing a first physical quantity obtained for each pair of the installed devices for each of the installed devices; a storage recording the first radio communication information acquired by the first acquirer for each of the installed devices; a second acquirer requesting a terminal present within the given space and the multiple installed devices to radio-communicate with each other so as to acquire second radio communication information representing a second physical quantity obtained for each pair of the terminal and installed devices; and a detector detecting the installed device from which the first physical quantity close to the second physical quantity is obtained among the multiple installed devices.

11 Claims, 17 Drawing Sheets

(56) References Cited

FOREIGN PATENT DOCUMENTS

| | | |
|---|---|---|
| JP | 2004-517572 A | 6/2004 |
| JP | 2007-085826 A | 4/2007 |
| JP | 2007-121014 A | 5/2007 |
| JP | 2009-200926 A | 9/2009 |
| JP | 2010-054277 A | 3/2010 |
| WO | 2006/117587 A1 | 11/2006 |

* cited by examiner

| No. | INSTALLED DEVICE INFORMATION | INSTALLED DEVICE ID | RECEIVING DEVICE ID | RECEIVED ELECTRIC FIELD INTENSITY (FIRST RADIO COMMUNICATION INFORMATION) |
|---|---|---|---|---|
| 1 | AIR CONDITIONER | xxx1 | xxx1 | E11 |
| | | | xxx2 | E12 |
| | | | xxx3 | E13 |
| | | | xxx4 | E14 |
| 2 | AIR CONDITIONER | xxx2 | xxx1 | E21 |
| | | | xxx2 | E22 |
| | | | xxx3 | E23 |
| | | | xxx4 | E24 |
| 3 | LIGHTING APPARATUS | xxx3 | xxx1 | E31 |
| | | | xxx2 | E32 |
| | | | xxx3 | E33 |
| | | | xxx4 | E34 |
| 4 | LIGHTING APPARATUS | xxx4 | xxx1 | E41 |
| | | | xxx2 | E42 |
| | | | xxx3 | E43 |
| | | | xxx4 | E44 |

| No. | INSTALLED DEVICE INFORMATION | INSTALLED DEVICE ID | CONTROL INFORMATION | PROVISIONING INFORMATION |
|---|---|---|---|---|
| 1 | AIR CONDITIONER | xxx1 | CONTROL INFORMATION 1 | PROVISIONING INFORMATION 1 |
| 2 | AIR CONDITIONER | xxx2 | CONTROL INFORMATION 2 | PROVISIONING INFORMATION 2 |
| 3 | LIGHTING APPARATUS | xxx3 | CONTROL INFORMATION 3 | PROVISIONING INFORMATION 3 |
| 4 | LIGHTING APPARATUS | xxx4 | CONTROL INFORMATION 4 | PROVISIONING INFORMATION 4 |

FIG.13

| MOBILE TERMINAL ID | RECEIVING DEVICE ID | RECEIVED ELECTRIC FIELD INTENSITY (SECOND RADIO COMMUNICATION INFORMATION) |
|---|---|---|
| xxxa | xxx1 | Ea1 |
| xxxa | xxx2 | Ea2 |
| xxxa | xxx3 | Ea3 |
| xxxa | xxx4 | Ea4 |

FIG.15

| No. | INSTALLED DEVICE INFORMATION | INSTALLED DEVICE ID | RECEIVING DEVICE ID | RECEIVED ELECTRIC FIELD INTENSITY | CORRECTION COEFFICIENT | CORRECTED RECEIVED ELECTRIC FIELD INTENSITY (FIRST RADIO COMMUNICATION INFORMATION) |
|---|---|---|---|---|---|---|
| 1 | AIR CONDITIONER | xxx1 | xxx1 | E11 | C11 | E11' |
|   |   |   | xxx2 | E12 | C12 | E12' |
|   |   |   | xxx3 | E13 | C13 | E13' |
|   |   |   | xxx4 | E14 | C14 | E14' |
| 2 | AIR CONDITIONER | xxx2 | xxx1 | E21 | C21 | E21' |
|   |   |   | xxx2 | E22 | C22 | E22' |
|   |   |   | xxx3 | E23 | C23 | E23' |
|   |   |   | xxx4 | E24 | C24 | E24' |
| 3 | LIGHTING APPARATUS | xxx3 | xxx1 | E31 | C31 | E31' |
|   |   |   | xxx2 | E32 | C32 | E32' |
|   |   |   | xxx3 | E33 | C33 | E33' |
|   |   |   | xxx4 | E34 | C34 | E34' |
| 4 | LIGHTING APPARATUS | xxx4 | xxx1 | E41 | C41 | E41' |
|   |   |   | xxx2 | E42 | C42 | E42' |
|   |   |   | xxx3 | E43 | C43 | E43' |
|   |   |   | xxx4 | E44 | C44 | E44' |

FIG.16

| EVALUATION VALUE (V) | DEGREE OF SIMILARITY |
|---|---|
| V<Va | S5 |
| Va≦V<Vb | S4 |
| Vb≦V<Vc | S3 |
| Vc≦V<Vd | S2 |
| Vd≦V | S1 |

FIG.17A

| EVALUATION VALUE REGARDING RECEIVED ELECTRIC FIELD INTENSITY (V1) | DEGREE OF SIMILARITY |
|---|---|
| V1<Va | S5 |
| Va≦V1<Vb | S4 |
| Vb≦V1<Vc | S3 |
| Vc≦V1<Vd | S2 |
| Vd≦V1 | S1 |

FIG.17B

| EVALUATION VALUE REGARDING RADIO WAVE PROPAGATION TIME (V2) | DEGREE OF SIMILARITY |
|---|---|
| V2<Ve | S5 |
| Ve≦V2<Vf | S4 |
| Vf≦V2<Vg | S3 |
| Vg≦V2<Vh | S2 |
| Vh≦V2 | S1 |

FIG.17C

| EVALUATION VALUE REGARDING ARRIVING ANGLE (V3) | DEGREE OF SIMILARITY |
|---|---|
| V3<Vh | S5 |
| Vh≦V3<Vi | S4 |
| Vi≦V3<Vj | S3 |
| Vj≦V3<Vk | S2 |
| Vk≦V3 | S1 |

POSITION IDENTIFICATION APPARATUS, POSITION IDENTIFICATION METHOD, POSITION IDENTIFICATION SYSTEM, RECORDING MEDIUM, AIR CONDITIONING SYSTEM, AND LIGHTING SYSTEM

CROSS REFERENCE TO RELATED APPLICATION

This application is a U.S. national stage application of PCT/JP2011/051970 filed on Jan. 30, 2011.

TECHNICAL FIELD

The present invention relates to a locating apparatus, locating method, locating system, and program.

BACKGROUND

It is generally known that the electric field intensity of radio signals changes according to the distance between the radio transmitter and radio receiver. Using this matter, techniques of calculating the distances between a radio transmitter and radio receivers based on the electric field intensity of radio signals received by the radio receivers installed at different locations and locating the radio transmitter transmitting the radio signals using the principle of so-called triangulation are generally known.

The above locating techniques work on the presumption that there are no people and/or objects (obstacles) that hamper the radio wave propagation in the space where the locating takes place. In other words, when there are obstacles, the radio transmitter may not be accurately located because the radio signals are affected by multipath fading and the like.

The locating apparatus of Patent Literature 1 is known to be able to accurately locate the radio transmitter even under the circumstances in which there are obstacles. In this locating apparatus, information representing the electric field intensity of received radio signals transmitted from a given location is recorded for each divided area of a space in advance. This locating apparatus makes reference to the information recorded in advance based on the electric field intensity of radio signals a communication terminal actually moving in the space has received at a given location in the space to locate the communication terminal.

Patent Literature 1: Unexamined Japanese Patent Application Kokai Publication No. H11-178045.

When the spatial radio wave propagation environment is subject to change as a result of some obstacle having moved or the like, the electric field intensity of radio signals received by the communication terminal placed in each area also changes; then, the locating technique described in the Patent Literature 1 fails to locate the communication device with accuracy.

SUMMARY

The present invention is invented with the view of the above problem and an exemplary objective of the present invention is to provide a locating apparatus, locating method, locating system, and program capable of locating a locating-target communication terminal with accuracy even if the radio wave propagation environment is subject to change.

The locating apparatus according to the present invention comprises:

first radio communication information acquisition means requesting multiple installed devices installed within a given space to radio-communicate with each other so as to acquire first radio communication information representing a first physical quantity obtained for each pair of the installed devices for each of the installed devices;

first radio communication information storing means recording the first radio communication information acquired by the first radio communication information acquisition means for each of the installed devices;

second radio communication information acquisition means requesting a terminal to be located within the given space and the multiple installed devices to radio-communicate with each other so as to acquire second radio communication information representing a second physical quantity obtained for each pair of the terminal and installed devices; and nearby installed device detection means detecting the installed device from which the first physical quantity satisfying a predetermined given condition with respect to the second physical quantity is obtained among the multiple installed devices.

Advantageous Effects of Invention

The present invention can locate a locating-target communication terminal with accuracy even if the radio wave propagation environment is subject to change.

BRIEF DESCRIPTION OF DRAWINGS

FIG. 5 is an illustration showing the structure of the radio communication data recorded on the storage of the locating apparatus according to an embodiment of the present invention;

FIG. 6 is an illustration showing the structure of the control/provisioning data including control information and provisioning information recorded on the storage of the locating apparatus according to an embodiment of the present invention;

FIG. 13 is an illustration showing the structure of the second radio communication data acquired by the locating apparatus according to an embodiment of the present invention;

FIG. 15 is an illustration showing the structure of the radio communication data recorded on the storage of the locating apparatus according to a modified embodiment of the present invention;

FIG. 16 is an illustration showing the correspondence table associating the evaluation value ranges with the degrees of similarity;

FIG. 17A is an illustration showing the correspondence tables associating the evaluation values regarding the received electric field intensity;

FIG. 17B is an illustration showing the correspondence tables associating the evaluation values regarding radio wave propagation time; and FIG. 17C is an illustration showing the correspondence tables associating the evaluation values regarding arriving angle with the degrees of similarity.

DETAILED DESCRIPTION

Figure 1:
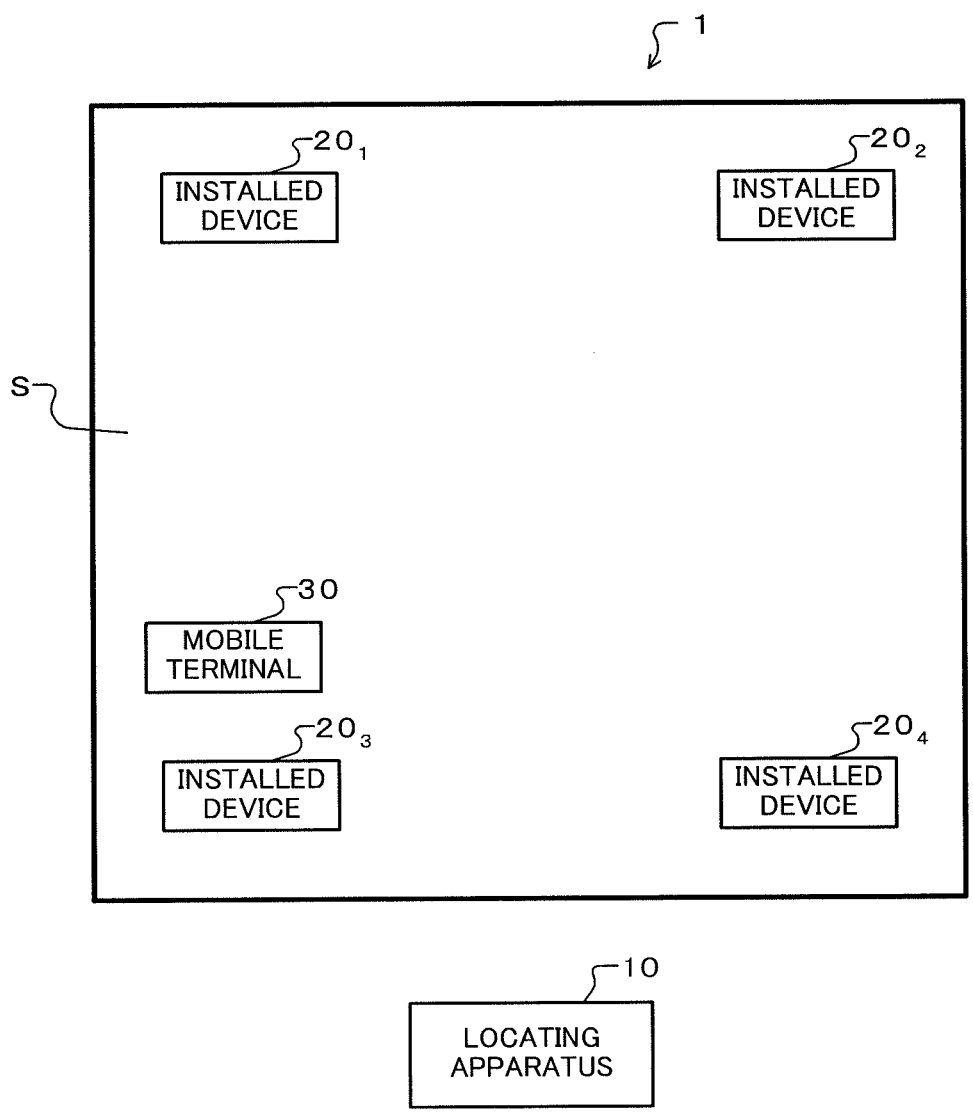
FIG. 1 is a block diagram of the locating system according to an embodiment of the present invention.

The locating apparatus, locating method, locating system, and program according to an embodiment of the present invention will be described hereafter with reference to the drawings.

First, a locating system 1 according to this embodiment will be described with reference to FIG. 1. The locating system 1 comprises a locating apparatus 10, multiple (here, four) installed devices 20 (installed devices $20_1$ to $20_4$), and a mobile terminal 30.

The locating system 1 is a system used in a limited (relatively small) space S such as in a building or underground shopping arcade where the GPS or like cannot locate an object. The locating apparatus 10 detects an installed device 20 near the mobile terminal 30 moving in the space S so as to locate the mobile terminal 30.

The installed devices $20_1$ to $20_4$ are equipment items of which the installation locations are fixed such as air conditioners or lighting apparatuses.

The mobile terminal 30 is a remote controller or the like operating an air conditioner or lighting apparatus and its location can change.

The installed devices $20_1$ to $20_4$ and mobile terminal 30 have radio communication capability. The installed devices $20_1$ to $20_4$ and mobile terminal 30 each transmit radio signals within the space S. Here, it is assumed that the installed devices $20_1$ to $20_4$ and mobile terminal 30 transmit radio signals of an equal transmission output level.

Figure 2:
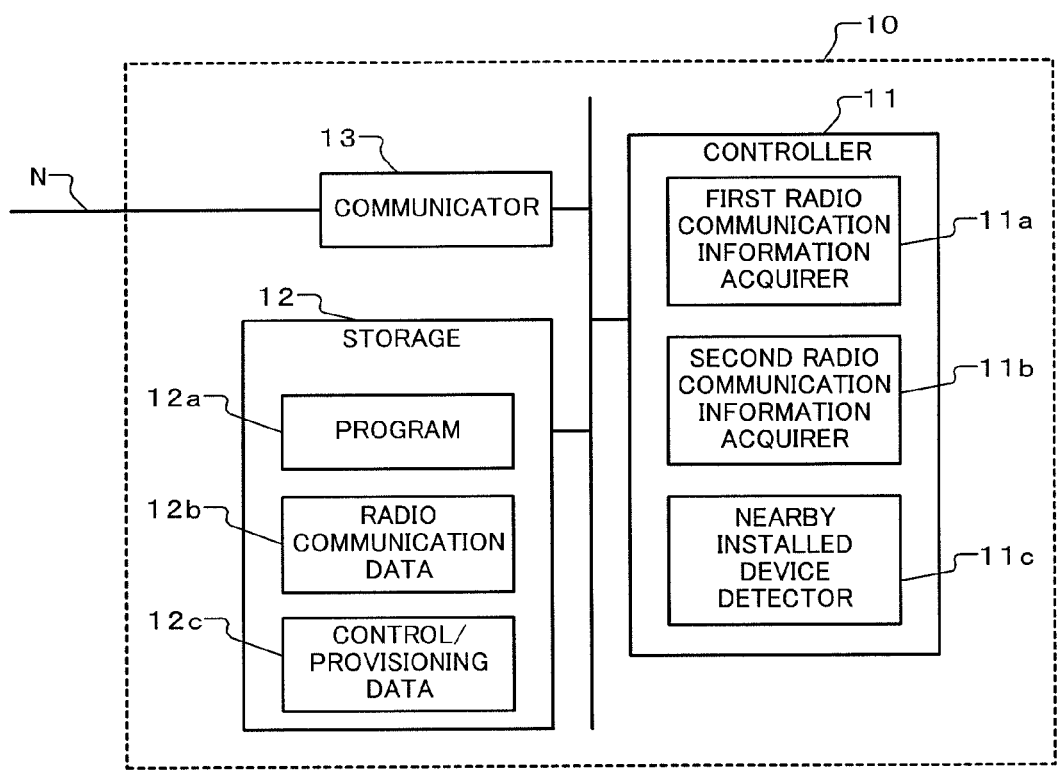
FIG. 2 is a block diagram showing the functional configuration of the locating apparatus according to an embodiment of the present invention.

The locating apparatus 10 comprises, as shown in FIG. 2, a controller 11, a storage 12, and a communicator 13.

The controller 11 controls the entire locating apparatus 10.

The controller 11 physically comprises, for example, a CPU (Central Processing Unit), a RAM (Random Access Memory) functioning as the main memory of the CPU, and the like. Here, the controller 11 can be configured by a dedicated circuit such as an ASIC (Application Specific Integrated Circuit) in part.

On the other hand, the controller 11 functionally comprises a first radio communication information acquirer 11a, a second radio communication information acquirer 11b, and a nearby installed device detector 11c.

The first radio communication information acquirer 11a, second radio communication information acquirer 11b, and nearby installed device detector 11c are each realized by the CPU constituting the controller 11 executing a program 12a recorded on the storage 12, and execute the process described later.

The first radio communication information acquirer 11a requests the installed devices $20_1$ to $20_4$ shown in FIG. 1 to transmit radio signals and the installed devices $20_1$ to $20_4$ to receive radio signals transmitted from the other installed devices $20_1$ to $20_4$, and acquires from the installed devices $20_1$ to $20_4$ first radio communication information representing the electric field intensities of the radio signals received by the installed devices $20_1$ to $20_4$. The first radio communication information acquirer 11a acquires the first radio communication information (information representing the received electric field intensity) at given times and updates radio communication data 12b recorded on the storage 12 for dealing with the latest radio wave propagation environment.

For locating the mobile terminal 30 shown in FIG. 1, the second radio communication information acquirer 11b requests the mobile terminal 30 to transmit radio signals and the installed devices $20_1$ to $20_4$ to receive the radio signals transmitted by the mobile terminal 30, and acquires from the installed devices $20_1$ to $20_4$ second radio communication information representing the electric field intensity of the received radio signals.

The nearby installed device detector 11c detects the installed device 20 with which the electric field intensities are closest to each other based on the comparison results between the electric field intensity represented by the first radio communication information contained in the radio communication data 12b recorded on the storage 12 in advance and the electric field intensity represented by the second radio communication information acquired by the second radio communication information acquirer 11b so as to locate the mobile terminal 30.

The storage 12 stores various programs and data such as a program 12a executed by the CPU, radio communication data 12b used by the nearby installed device detector 11c for locating the mobile terminal 30 shown in FIG. 1, and control/provisioning data 12c including control information controlling the installed device 20 near the mobile terminal 30 and provisioning information to be provided to the mobile terminal 30. The storage 12 comprises, for example, a nonvolatile memory such as a ROM (Read Only Memory) and flash memory. The radio communication data 12b and control/provisioning data 12c will be described in detail later.

The communicator 13 communicates with the installed devices 20 and mobile terminal 30 via a network N under the control of the controller 11 (the first radio communication information acquirer 11a or second radio communication information acquirer 11b). The communicator 13 comprises a communication device including connectors and the like. The network N is, for example, a LAN (Local Area Network), line switching network, packet switching network, Internet, dedicated network, or the like. Here, the network N can be a wired or wireless communication network to communicate with the installed devices 20 while the network N is a wireless communication network to communicate with the mobile terminal 30.

Figure 3:
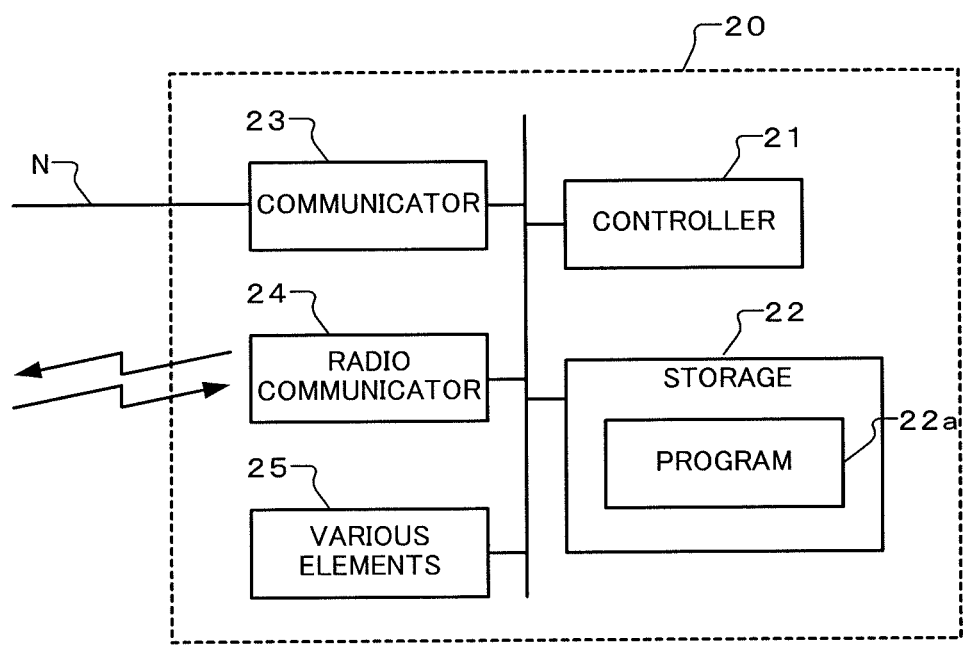
FIG. 3 is a block diagram showing the functional configuration of an installed device according to an embodiment of the present invention.

The configuration of multiple installed devices 20 (installed devices $20_1$ and $20_4$) shown in FIG. 1 will be described hereafter with reference to FIG. 3. Each installed device 20 comprises a controller 21, a storage 22, a communicator 23, a radio communicator 24, and various elements 25.

The controller 21 controls the entire installed device 20. The controller 21 physically comprises, for example, a CPU, a RAM functioning as the main memory of the CPU, and the like. As the CPU executes a program 22a recorded on the storage 22, the controller 21 executes the process described later. Here, the controller 21 can be configured by a dedicated circuit such as an ASIC in part.

The storage 22 stores various programs and data such as the program 22a executed by the CPU. The storage 22 comprises, for example, a nonvolatile memory such as a ROM and flash memory.

The communicator 23 communicates with the locating apparatus 10 via a network N under the control of the controller 21. The communicator 23 comprises a communication device including connectors and the like. The network N is, for example, a LAN, line switching network, packet switching network, Internet, dedicated network, or the like. Furthermore, the network N can be a wired or wireless communication network.

The radio communicator 24 radio-communicates with the other installed devices 20 or mobile terminal 30 under the control of the controller 21. The radio communicator 24 comprises a modulation/demodulation circuit, a frequency multiplying circuit, an RF (Radio Frequency) input/output circuit, a transmission/reception antenna, and the like.

The various elements 25 are components having functions according to the type of the installed device 20. In other words, the various elements 25 have different functions depending on the type of the installed device 20 or the like. For example, if the installed device 20 is an air conditioner, the various elements 25 comprise a temperature adjuster adjusting the air-conditioning temperature, a humidity adjuster adjusting the air-conditioning humidity, an airflow rate adjuster adjusting the air-conditioning airflow rate, an airflow direction adjuster adjusting the air-conditioning airflow direction, and the like. If the installed device 20 is a lighting apparatus, the various elements 25 comprise a dimmer adjusting the amount of illumination light and the like.

Figure 4:
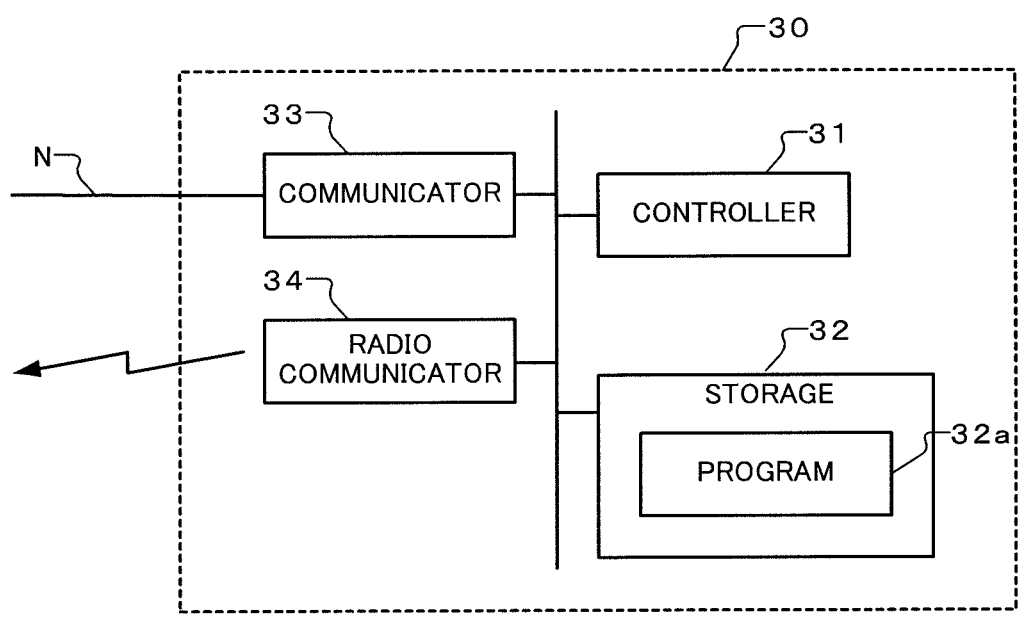
FIG. 4 is a block diagram showing the functional configuration of the mobile terminal according to an embodiment of the present invention.

The configuration of the mobile terminal 30 shown in FIG. 1 will be described hereafter with reference to FIG. 4. The mobile terminal 30 comprises a controller 31, a storage 32, a communicator 33, and a radio communicator 34.

The controller 31 controls the entire mobile terminal 30. The controller 31 physically comprises, for example, a CPU, a RAM functioning as the main memory of the CPU, and the like. As the CPU executes a program 32a recorded on the storage 32, the controller 31 executes the process described later. Here, the controller 31 can be configured by a dedicated circuit such as an ASIC in part.

The storage 32 stores various programs and data such as the program 32a executed by the CPU. The storage 32 comprises, for example, a nonvolatile memory such as a ROM and flash memory.

The communicator 33 communicates with the locating apparatus 10 via a network N under the control of the controller 31. The communicator 33 comprises a communication device including connectors and the like. The network N is, for example, a LAN, line switching network, packet switching network, Internet, dedicated network, or the like. Furthermore, the network N is a wireless communication network.

The radio communicator 34 radio-communicates with the multiple installed devices 20 under the control of the controller 31. The radio communicator 34 comprises a modulation/demodulation circuit, a frequency multiplying circuit, an RF (Radio Frequency) input/output circuit, a transmission/reception antenna, and the like.

The structure of the radio communication data 12b recorded on the storage 12 of the locating apparatus 10 shown in FIG. 2 will be described hereafter with reference to FIG. 5.

The radio communication data 12b are data created by associating a data number, installed device information, an installed device ID, a receiving device ID, and first radio communication information with each other. The radio wave propagation environment in the space S shown in FIG. 1 is represented by the radio communication data 12b.

The data number is a number given in the order of the installed device information and/or installed device ID being recorded on the storage 12, and used for identifying the radio communication data 12b in the process of updating the radio communication data described later. The installed device information is information representing the type of the installed device 20 (an air conditioner, lighting apparatus, or the like). The installed device ID is information uniquely identifying the installed device 20. For example, installed device IDs "xxx1" to "xxx4" corresponding to the installed devices $20_1$ to $20_4$ shown in FIG. 1, respectively, are recorded in the radio communication data 12b. The receiving device ID is the installed device ID of an installed device 20 that is the transmission source of radio signals received by the installed device 20. The first radio communication information is information representing the electric field intensity of radio signals received by the installed device 20.

The radio communication data 12b includes the receiving device ID that is the same ID as the installed device ID. Furthermore, this receiving device ID is associated with information representing the received electric field intensity of radio signals transmitted by its own device. As this received electric field intensity, the electric field intensity (a predetermined value) of signals transmitted by that installed device 20 is used. For example, the radio communication data 12b having a data number "1" includes a receiving device ID "xxx1" that is the same ID as the installed device ID "xxxx1." This receiving device ID "xxx1" is associated with information "E11" representing the transmitted electric field intensity of the installed device having the installed device ID "xxx1."

As described above, as the radio wave propagation environment is subject to change as a result of some obstacle hampering the radio wave propagation such as people and/or objects in the space S having moved or the like, the received electric field intensity obtained in mutual radio communication of the installed devices 20 also changes. Then, the locating apparatus 10 executes the process of updating the first radio communication information (information representing the received electric field intensity) on each installed device 20 at given times for dealing with the latest radio wave propagation environment. This process will be described in detail.

The structure of the control/provisioning data 12c recorded on the storage 12 of the locating apparatus 10 shown in FIG. 2 will be described hereafter with reference to FIG. 6.

The control/provisioning data 12c are data created by associating a data number, installed device information, an installed device ID, control information, and provisioning information with each other. The data number, installed device information, and installed device ID are the same as the data number, installed device information, and installed device ID in the radio communication data 12b shown in FIG. 5, respectively.

The control information is information used for controlling a control-target installed device 20. For example, if the installed device 20 is an air conditioner, setting information for controlling the temperature, humidity, airflow rate, airflow direction, and the like is set in advance as the control information. With the control information being sent to the air conditioner 20, the air conditioner 20 controls the temperature adjuster, humidity adjuster, airflow rate adjuster, and airflow direction adjuster (the various elements 25 shown in FIG. 3) of the air conditioner 20 according to the control information. On the other hand, if the installed device 20 is a lighting apparatus, setting information for controlling the brightness and the like is set in advance as the control information. With the control information being sent to the lighting apparatus 20, the lighting apparatus 20 controls the dimmer and the like (the various elements 25 shown in FIG. 3) according to the control information.

The provisioning information is information regarding the installed device 20 and provided to the mobile terminal 30 when the mobile terminal 30 is located. For example, if the installed device 20 is an air conditioner, the provisioning information is data representing a menu screen used for setting the temperature, humidity, airflow rate, airflow direction, and the like. On the other hand, if the installed device 20 is a lighting apparatus, the provisioning information is data representing a menu screen used for setting the brightness and the like. As described later, the mobile terminal 30 is located by detecting the installed device 20 nearest to the mobile terminal 30. As the mobile terminal 30 is located, the mobile terminal 30 receives information regarding the installed device 20 nearest to the mobile terminal 30. The mobile terminal 30 displays a menu represented by the received provisioning information on the display screen. Then, the user carrying the mobile terminal 30 can check on the menu regarding the installed device 20 near the mobile terminal 30 and execute various setting operations on the displayed menu. The mobile terminal 30 sends the radio signals corresponding to the various setting operations to the installed device 20. Then, the installed device 20 controls in accordance with the set details contained in the radio signals. In other words, for example, if the installed device 20 is an air conditioner, the controller 21 of the air conditioner 20 controls the temperature adjuster, humidity adjuster, airflow rate adjuster, and airflow direction adjuster (the various elements 25 shown in FIG. 3) of the air conditioner in accordance with the set details to adjust the temperature, humidity, airflow rate, airflow direction, and the like. On the other hand, if the installed device 20 is a lighting apparatus, the controller 21 of the installed device 20 controls the dimmer and the like of the lighting apparatus in accordance with the set details contained in the radio signals to adjust the amount of illumination light and the like.

Operation of the locating system 1 having the above configuration will be descried hereafter.

The locating system 1 generally executes:

(1) the operation of periodically updating/recording the radio communication data 12b shown in FIG. 5 through mutual communication of the installed devices 20₁ to 20₄;

(2) the operation of periodically acquiring locating data through radio communication between the mobile terminal 30 and multiple installed devices 20₁ to 20₄ and comparing the acquired locating data with radio communication data to locate the mobile terminal 30 (the installed devices 20₁ to 20₄ located near the mobile terminal 30); and (3) the operation of conducting a given control based on the detected location (the installed devices 20₁ to 20₄ located near the mobile terminal 30).

The operations will be described hereafter on a scene basis.

First, the procedure to periodically update/record the radio communication data 12b, which is set forth in the above general operation (1) of the locating system 1, will be described with reference to FIGS. 7 to 9. Here, the locating apparatus 10, installed device 20, and mobile terminal 30 execute multiple tasks simultaneously in parallel in a time-sharing manner and, for example when a task is queued, execute another task.

Figure 7:
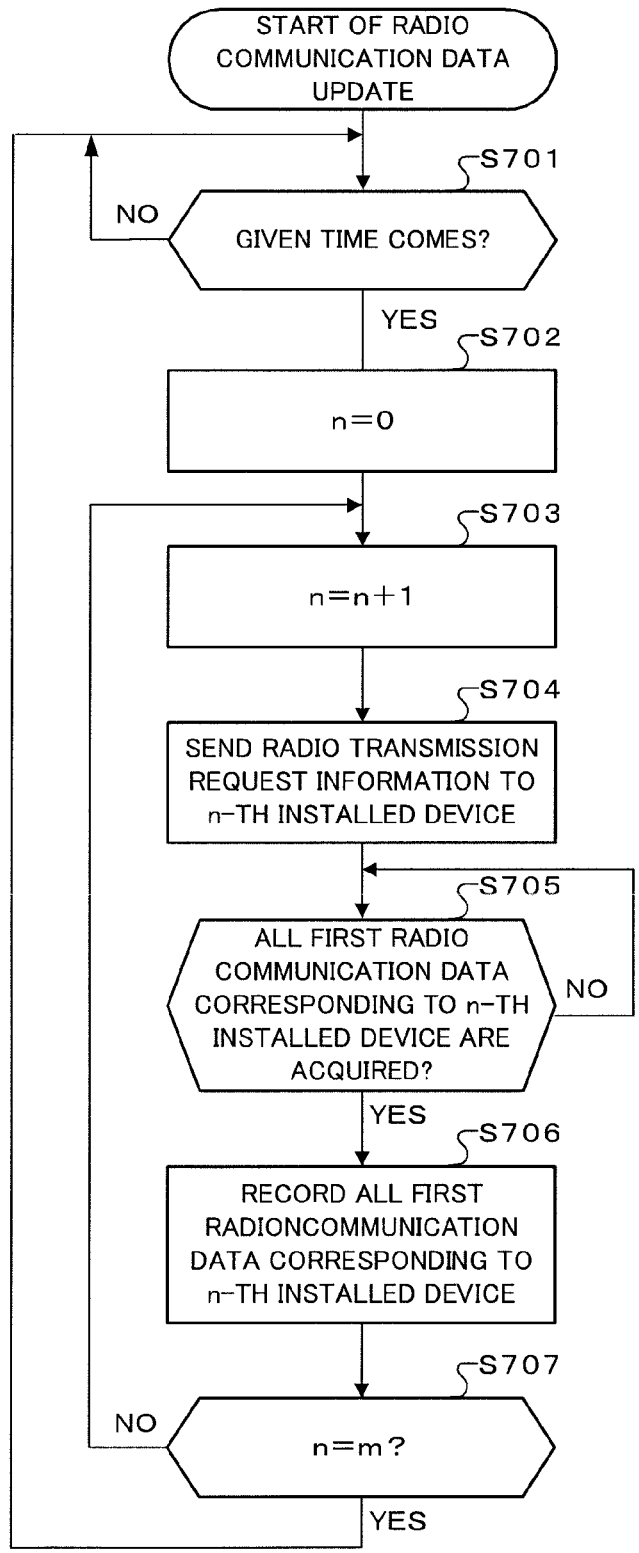
FIG. 7 is a flowchart showing the procedure for the locating apparatus according to an embodiment of the present invention to update the radio communication data recorded on the storage.
Figure 8:
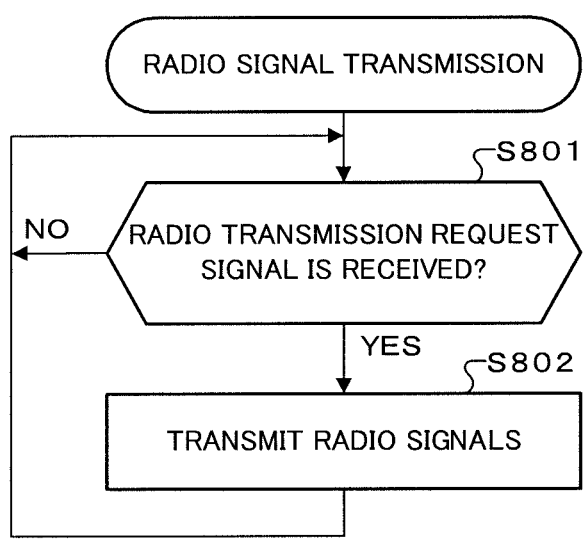
FIG. 8 is a flowchart showing the procedure for an installed device according to an embodiment of the present invention to transmit radio signals.

As the locating apparatus 10 is powered on, the controller 11 (CPU) of the locating apparatus 10 reads and runs the program 12a recorded on the storage 12 to execute the procedure shown in FIG. 7.

First, the first radio communication information acquirer 11a monitors whether a given time to update the radio communication data 12b recorded on the storage 12 has come and waits until the given time has come (Step S701; NO).

The first radio communication information acquirer 11a sets a number n indicated by each of multiple radio communication data recorded on the storage 12 for n=0 (Step S702) and then increments n (Step S703). In other words, here, the first radio communication information acquirer 11a specifies the radio communication data 12b having a data number 1 among multiple radio communication data 12b recorded on the storage 12.

The first radio communication information acquirer 11a sends a radio signal transmission request signal (radio transmission request signal) from the communicator 13 to the installed device 20 (here, an air conditioner) identified by the installed device ID (here, "xxx1") contained under the specified data number n (here, the number 1) via the network N (Step S704). Then, the first radio communication information acquirer 11a switches to standby mode to await reception of first radio communication data transmitted from the installed device 20 (Step S705).

On the other hand, as the installed device 20 is powered on, the controller 21 (CPU) of the installed device 20 reads and runs the program 22a recorded on the storage 22. As shown in FIG. 8, the controller 21 monitors whether a radio transmission request signal is received from the locating apparatus 10 according to the program 22a and waits until a radio transmission request signal is received (Step S801).

As the communicator 23 receives a radio transmission request signal from the locating apparatus 10 (Step S801; YES), the controller 21 creates radio signals containing the installed device ID of the installed device 20 and transmits the radio signals via the radio communicator 24 (Step S802). For example, when the installed device 20₁ shown in FIG. 1 has an installed device ID "xxx1," the installed device 20₁ creates and transmits radio signals containing the installed device ID "xxx1." Then, returning to the Step S801, the controller 21 monitors whether a radio transmission request signal is received from the locating apparatus 10 and waits until a radio transmission request signal is received (Step S801).

Figure 9:
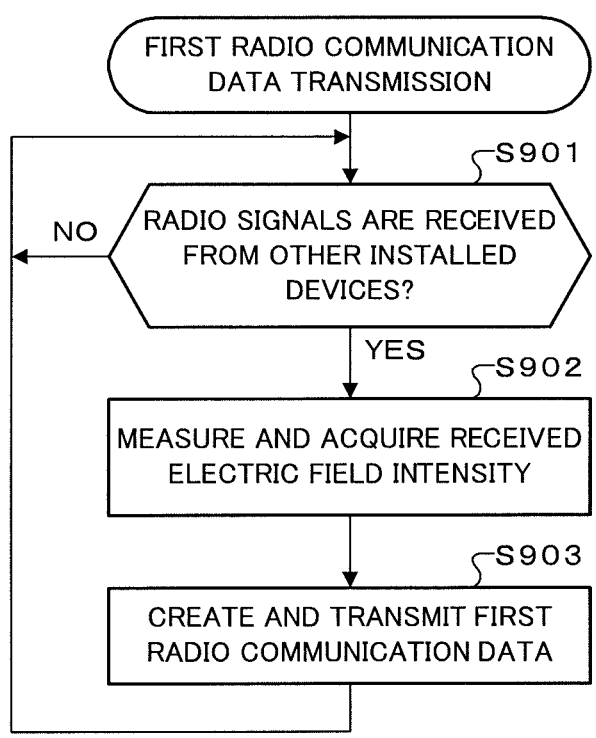
FIG. 9 is a flowchart showing the procedure for an installed device according to an embodiment of the present invention to transmit the first radio communication data.

Furthermore, as shown in FIG. 9, the controller 21 monitors whether radio signals are received from another installed device 20 according to the program 22a and waits until radio signals are received (Step S901). Here, as described later, the installed device 20 monitors whether radio signals transmitted from the mobile terminal 30 are received according to the program 22a and waits until radio signals are received (Step S1201; NO shown in FIG. 12). In other words, the controller 21 simultaneously monitors whether a radio transmission request signal is received from the locating apparatus 10, whether radio signals are received from another installed device 20, and whether radio signals transmitted from the mobile terminal 30 are received.

As the radio communicator 24 receives radio signals (Step S901; YES), the controller 21 measures the electric field intensity of the received radio signals and acquires information representing the electric field intensity as first radio communication information (Step S902). For example, when each of the installed devices $20_2$ to $20_4$ shown in FIG. 1 receives radio signals transmitted from the installed device $20_k$, the installed devices $20_2$ to $20_4$ measure the electric field intensities "E12" to "E14" of the received radio signals and acquire information representing the measured electric field intensities "E12" to "E14" as first radio communication information.

The controller 21 creates first radio communication data containing the measured received electric field intensity, the installed device ID of the installed device 20 that is the transmission source of the radio signals, and the receiving device ID of the receiving device 20 that have received the radio signals, namely the installed device ID of its own device, and sends the first radio communication data to the locating apparatus 10 via the communicator 23 (Step S903). Here, the installed device ID of the installed device 20 that is the transmission source of the radio signals can be contained in the first radio communication data by extracting the installed device ID contained in the received radio signals. For example, the installed device $20_2$ that have received the radio signals transmitted from the installed device $20_1$ shown in FIG. 1 creates first radio communication data containing the received electric field intensity "E12" measured by the installed device $20_2$, the installed device ID "xxx1" of the installed device $20_1$ that is the transmission source of the radio signals, and the installed device ID "xxx2" of its own device, and sends the first radio communication data to the locating apparatus 10.

Returning to FIG. 7, the first radio communication information acquirer 11a of the locating apparatus 10 waits until all first radio communication data corresponding to the n-th (here, first) installed device (the air conditioner 1) are acquired (Step S705; NO). Acquiring all first radio communication data (Step S705; YES), the first radio communication information acquirer 11a records and updates all first radio communication data corresponding to the n-th installed device on the storage 12 (Step S706). Here, all first radio communication data corresponding to the n-th installed device means all installed devices 20 except for its own installed device 20. As described above, of the radio communication data 12b, the received electric field intensity associated with the receiving device ID that is the same ID as the installed device ID is not influenced by obstacles. Therefore, there is no problem with the preset transmission electric field intensity (a predetermined value) not being updated.

In other words, as the communicator 13 receives first radio communication data, the first radio communication information acquirer 11a identifies the installed device 20 that has received the radio signals by the receiving device ID contained in the first radio communication data. Then, when the first radio communication information acquirer 11a identifies all installed devices 20 corresponding to the receiving device IDs ("xxx2" to "xxx4") associated with the installed device ID (the first installed device ID "xxx1") contained in the radio communication data 12b, the first radio communication information acquirer 11a records all first radio communication data corresponding to the n-th installed device on the storage 12 and updates the radio communication data recorded on the storage 12.

Then, the first radio communication information acquirer 11a determines whether the number n indicated by the updated radio communication data satisfies n=m (Step S707). Here, m is the highest data number in the radio communication data 12b recorded on the storage 12. Here, as shown in FIG. 5, the highest data number m in the radio communication data 12b recorded on the storage 12 is 4. Then, the first radio communication information acquirer 11a determines whether n=4. In other words, the first radio communication information acquirer 11a determines whether all radio communication data 12b recorded on the storage 12 have been updated/recorded.

Then, if n=m is not satisfied (Step S707; NO), the first radio communication information acquirer 11a returns to the Step S703 to increment n and repeats the above process in the Steps S704 to S707.

On the other hand, if n=m is satisfied (Step S707; YES), the first radio communication information acquirer 11a returns to the Step S701 and waits until the next given time happens and then repeats the above process in the Steps S701 to S707 until the power is turned off.

As described above, the first radio communication information acquirer 11a of the locating apparatus 10 acquires the first radio communication information (information representing the received electric field intensity) of each installed device and updates the first radio communication information contained in the radio communication data 12b recorded on the storage 12 at given times for dealing with the latest radio wave propagation environment. Thus, in the process of locating the mobile terminal 30 moving in the space S as described below, the radio communication data 12b complying with the latest radio wave propagation environment can be used to locate the mobile terminal 30.

An operation to locate the mobile terminal 30 moving in the space S (a nearby installed device 20) and conduct control corresponding to the location, which are set forth in the above general operations (2) and (3) of the locating system, will be described hereafter with reference to FIGS. 10 to 12.

Figure 10:
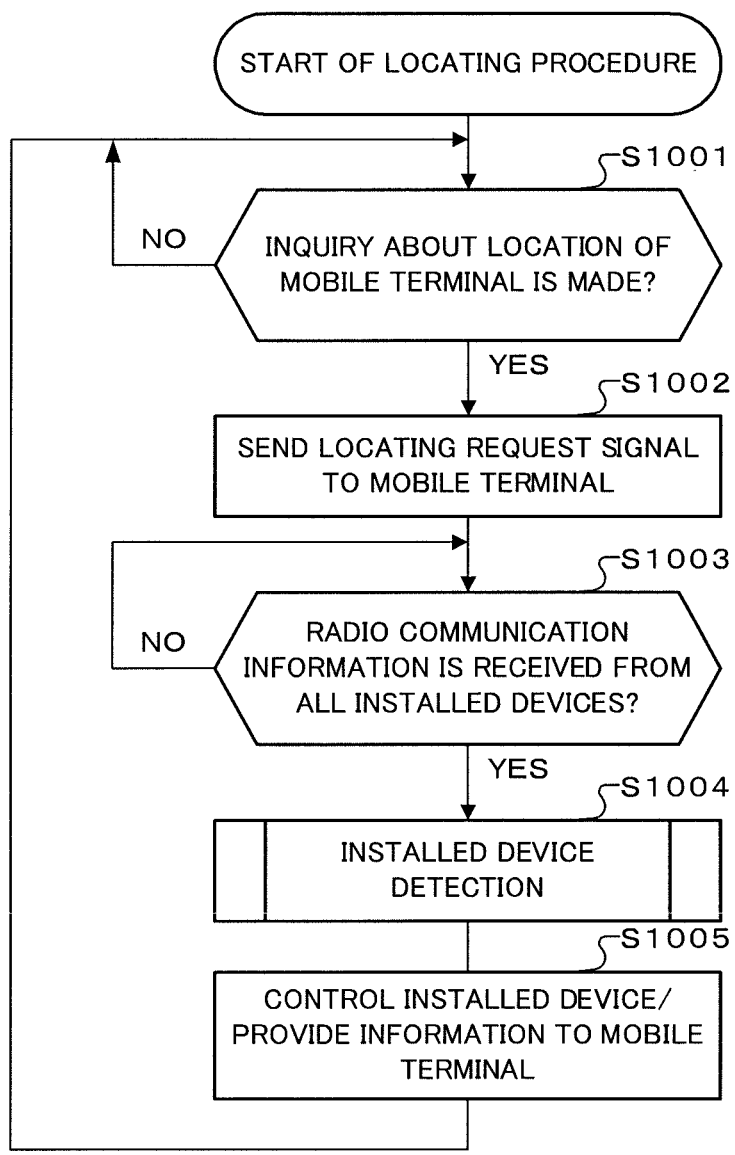
FIG. 10 is a flowchart showing the procedure for the locating apparatus according to an embodiment of the present invention to locate the mobile terminal.

As shown in FIG. 10, the second radio communication information acquirer 11b of the locating apparatus 10 waits for an inquiry about the location of the mobile terminal 30 according to the program 12a (Step S1001; NO). For example, receiving a location inquiry signal for inquiring about the location of the mobile terminal 30 from the inputter (not shown) of the locating apparatus 10 or at a given time (Step S1001; YES), the second radio communication information acquirer 11b transmits a signal to request locating the mobile terminal 30 (a locating request signal) (Step S1002). Then, the second radio communication information acquirer 11b waits for reception of second radio communication data transmitted from the installed devices 20 (Step S1003).

Figure 11:
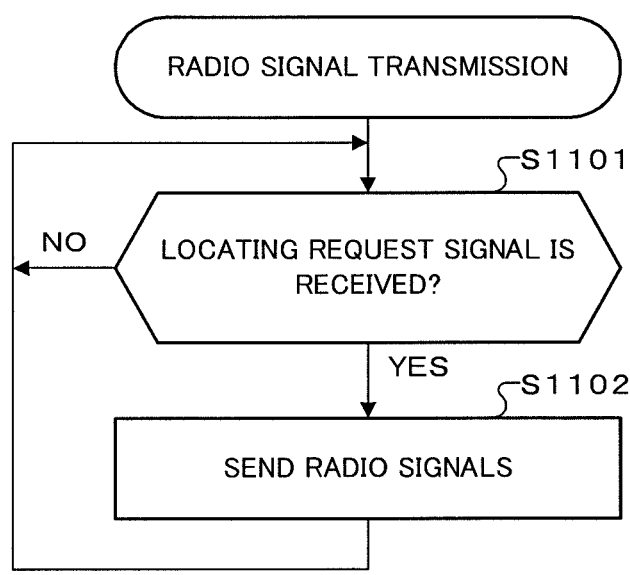
FIG. 11 is a flowchart showing the procedure for the mobile terminal according to an embodiment of the present invention to transmit radio signals.

On the other hand, as shown in FIG. 11, the controller 31 of the mobile terminal 30 waits for reception of a locating request signal according to a program 32a (Step S1101; NO). As the communicator 33 receives a locating request signal transmitted from the locating apparatus 10 (Step S1101; YES), the controller 31 creates radio signals containing the mobile terminal ID of the mobile terminal 30. The controller 31 transmits the created radio signals via the radio communicator 34 (Step S1102). For example, the mobile terminal 30 that has received a locating request signal from the locating apparatus 10 transmits radio signals containing a mobile terminal ID "xxxa."

Figure 12:
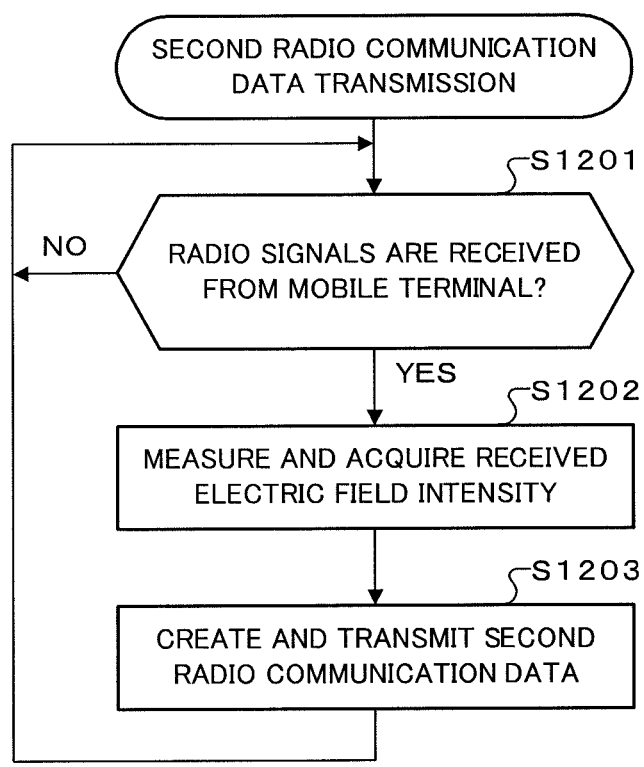
FIG. 12 is a flowchart showing the procedure for an installed device according to an embodiment of the present invention to transmit the second radio communication data.

On the other hand, as shown in FIG. 12, the controller 21 of the installed device 20 waits for reception of radio signals from the mobile terminal 30 according to the program 22a (Step S1201; NO). As the radio communicator 24 receives the radio signals (Step S1201; YES), the controller 21 measures the electric field intensity of the received radio signals and acquires information representing the electric field intensity as second radio communication information (Step S1202). For example, when the installed devices $20_1$ to $20_4$ shown in FIG. 1 each receive the radio signals transmitted from the mobile terminal 30, the installed devices $20_1$ to $20_4$ measure the electric field intensities "Ea1" to "Ea4" of the received radio signals, respectively, and acquire information representing the respective measured electric field intensities "Ea1" to "Ea4" as second radio communication information.

The controller 21 creates second radio communication data containing the measured received electric field intensity, the mobile terminal ID of the mobile terminal 30 that is the transmission source of the radio signals, and the receiving device ID of the receiving device 20 that has received the radio signals, namely the installed device ID of its own device, and sends the second radio communication data to the locating apparatus 10 via the communicator 23 (Step S1203). Here, the mobile terminal ID of the mobile terminal 30 that is the transmission source of the radio signals can be contained in the second radio communication data by extracting the mobile terminal ID contained in the received radio signals. For example, the installed device $20_1$ that has received the radio signals transmitted from the mobile terminal 30 shown in FIG. 1 creates second radio communication data, as shown in FIG. 13, containing the measured received electric field intensity "Ea1," the mobile terminal ID "xxxa" of the mobile terminal 30 that is the transmission source of the radio signals, and the installed device ID "xxx1" of its own device (the receiving device ID), and sends the second radio communication data to the locating apparatus 10.

Returning to FIG. 10, the second radio communication information acquirer 11b of the locating apparatus 10 waits until the second radio communication data are received from all installed devices 20 installed in the space S (the installed devices $20_1$ to $20_4$ shown in FIG. 1) (Step S1003; NO). As the second radio communication information acquirer 11b has received from all installed devices 20 their corresponding second radio communication data (Step S1003; YES), the nearby installed device detector 11c executes a locating procedure to compare the electric field intensity represented by the first radio communication information contained in the radio communication data 12b recorded on the storage 12 with the electric field intensity represented by the second radio communication information contained in the acquired second radio communication data, detect an installed device 20 with which the electric field intensities are equal to each other based on the comparison results, and identify the detected installed device 20 as the location of the mobile terminal 30 (Step S1004).

Figure 14:
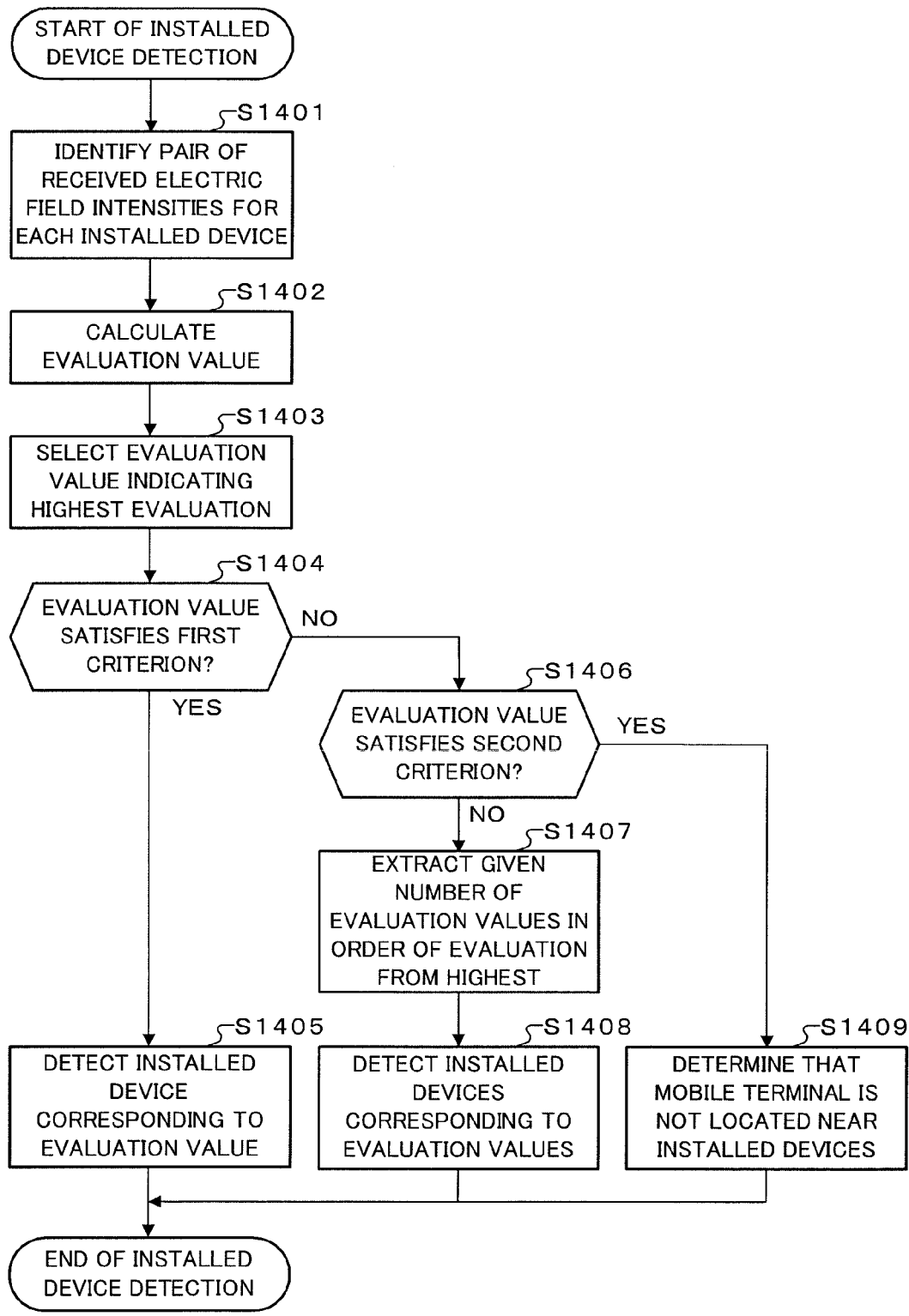
FIG. 14 is a flowchart showing the procedure of the installed device detection process executed by the locating apparatus according to an embodiment of the present invention.

More specifically, as shown in FIG. 14, the nearby installed device detector 11c reads the radio communication data 12b of each installed device (installed device ID) from multiple radio communication data 12b recorded on the storage 12 shown in FIG. 5. The nearby installed device detector 11c identifies a pair of electric field intensities associated with a receiving device ID that matches a receiving device ID in the read radio communication data 12b and a receiving device ID in the multiple second radio communication data acquired by the second radio communication information acquirer 11b (Step S1401).

The nearby installed device detector 11c selects, for example as shown in FIGS. 5 and 13, second radio communication data containing a receiving device ID matching, for example, a receiving device ID "xxx1" among multiple receiving device IDs ("xxx1" to "xxx4") contained under the installed device ID "xxx1" of the radio communication data 12b having a data number "No. 1," and identifies a pair of received electric field intensities ("E11" and "Ea1") associated with the matched receiving device ID "xxx1." For example, the nearby installed device detector 11c identifies pairs "E11, Ea1," "E12, Ea2," "E13, Ea3," and "E14, Ea4" with regard to the installed device ID "xxx1."

The nearby installed device detector 11c applies the above identified pairs of electric field intensities to a given formula for calculating an evaluation value for each installed device (installed device ID) that is used in evaluation as to whether the received electric field intensities obtained with the radio signals transmitted from the installed devices 20 and mobile terminal 30 satisfy a given condition for each other, for example the received electric field intensities are equal to each other (closest in value to each other). For example, the given formula is a formula below in which the square of the difference between the electric field intensities of each pair is integrated and the calculated value is used as the evaluation value.

$$Vn = (En1-Ea1)^2 + (En2-Ea2)^2 + \ldots (Enm-Eam)^2$$

V: Evaluation value;
n: number indicated in the radio communication data 12b; and
m: the highest data number in the radio communication data 12b.

More specifically, in the case of using the above pairs of electric field intensities identified with the radio communication data 12b having a data number "No. 1":

$$V1 = (En1-Ea1)^2 + (En2-Ea2)^2 + (En3-Ea3)^2 + (En4-Ea4)^2$$

In this way, the nearby installed device detector 11c calculates the evaluation value (here, V1 to V4) for each installed device (installed device ID).

Subsequently, after calculating all evaluation values, the nearby installed device detector 11c selects an evaluation value indicating the highest evaluation among the multiple calculated evaluation values (V1 to V4) (Step S1403). The evaluation value indicating the highest evaluation indicates that the distance between the mobile terminal 30 and the installed device 20 is the shortest (nearest). When the above formula is used, the distance between the installed device 20 and mobile terminal 30 is shorter (nearer) as the evaluation value is lower. Then, in such a case, the nearby installed device detector 11c selects the minimum evaluation value (Vmin) For example, the installed device $20_3$ is the nearest to the mobile terminal 30 among the installed devices $20_1$ to $20_4$ in the space S shown in FIG. 1. When the evaluation values V1 to V4 are calculated, the evaluation value V3 corresponding to the installed device $20_3$ is the lowest and the nearby installed device detector 11c selects the evaluation value V3.

The nearby installed device detector 11c determines whether the selected evaluation value satisfies a first preset criterion (Step S1404). The first criterion is a criterion for determining that the mobile terminal 30 is located at the installed device 20 corresponding to the selected evaluation value. For example, the nearby installed device detector 11c compares the above selected evaluation value (Vmin) with a first preset evaluation threshold. If the selected evaluation value is not greater than (or less than) the first evaluation threshold, the nearby installed device detector 11c determines that the selected evaluation value satisfies the first criterion (Step S1404; YES). In such a case, the nearby installed device detector 11c detects the installed device 20 corresponding to the selected evaluation value as the installed device located near the mobile terminal 30. The nearby installed device detector 11c identifies the detected installed device 20 as the location of the mobile terminal 30 (Step S1405).

On the other hand, if the selected evaluation value does not satisfy the first criterion (Step S1404; NO), the nearby installed device detector 11c determines whether the selected evaluation value satisfies a second preset criterion (Step S1406). The second criterion is a criterion for determining that the mobile terminal 30 is not located near the installed device 20 corresponding to the selected evaluation value. For example, the nearby installed device detector 11c compares the above selected evaluation value (Vmin) with a second preset evaluation threshold. If the selected evaluation value is not less than (or greater than) the second evaluation threshold, the nearby installed device detector 11c determines that the selected evaluation value satisfies the second criterion (Step S1406; YES). In such a case, the nearby installed device detector 11c determines that there is no installed device 20 near the mobile terminal 30 (Step S1409).

On the other hand, if the selected evaluation value does not satisfy the second criterion (Step S1406; NO), the nearby installed device detector 11c selects a given number (for example, three) of evaluation values in the order of evaluation from the highest among multiple evaluation values (V1 to V4) calculated in the Step S1402 (Step S1407). Then, the nearby installed device detector 11c identifies the installed devices 20 corresponding to the selected given number of evaluation values, respectively, as the installed devices near the mobile terminal 30 (Step S1408). Thus, the nearby installed device detector 11c determines that the mobile terminal 30 is located near the given number of identified installed devices 20 (in the area enclosed by the lines connecting the given number of installed devices 20 to each other). For example, if the selected evaluation value V3 does not satisfy the first and second criteria, three evaluation values, for example V1, V3, and V4, are selected in the order of evaluation value from the lowest. The installed devices 20 corresponding to the selected evaluation values V1, V3, and V4 (the installed devices $20_1$, $20_3$, and $20_4$ shown in FIG. 1) are detected, and the detected installed devices $20_k$, $20_3$, and $20_4$ are identified as the location of the mobile terminal 30.

Returning to FIG. 10, after locating the mobile terminal 30, the nearby installed device detector 11c acquires control information and provisioning information corresponding to the installed device 20 detected as being near the mobile terminal 30 using the control/provisioning data 12c recorded on the storage 12. The nearby installed device detector 11c designates the installed device 20 near the mobile terminal 30 as the control target and controls the control target installed device 20 according to the acquired control information. Furthermore, the nearby installed device detector 11c provides the mobile terminal 30 with information regarding the installed device 20 (Step S1005).

More specifically, if the installed device 20 detected as being near the mobile terminal 30 has an installed device ID "xxx3," the nearby installed device detector 11c acquires "CONTROL INFORMATION 3" and "PROVISIONING INFORMATION 3" associated with "xxx3." The nearby installed device detector 11c sends the acquired control information 3 to the installed device 20 having the installed device ID "xxx3" (the installed device $20_3$ shown in FIG. 1). Then, the installed device 20 (a lighting apparatus) controls the dimmer (the various elements 25 shown in FIG. 3) of the lighting apparatus according to the control information such as various set values represented by the received control information to adjust the illumination light and the like. Furthermore, the nearby installed device detector 11c sends the acquired provisioning information 3 to the mobile terminal 30. Then, the mobile terminal 30 displays on the display screen a menu or the like of the installed device 20 (a lighting apparatus) having the installed device ID "xxx3" that is represented by the received provisioning information 3. Then, the user who carries the mobile terminal 30 can set the amount of illumination light and the like of the lighting apparatus and the mobile terminal 30 functions as a remote controller for the installed device 20 detected as the control target.

Then, the second radio communication information acquirer 11b returns to the Step S1001 and waits for the next locating inquiry, then repeating the process in the Steps S1001 to S1005 until the power is turned off.

As described above, in this embodiment, for locating the mobile terminal 30, the locating apparatus 10 requests the mobile terminal 30 to transmit radio signals and acquires the electric field intensities of the radio signals received by multiple installed devices 20 as radio communication information (the second radio communication information). Then, the locating apparatus 10 identifies the installed device 20 near the mobile terminal 30 based on the comparison results between the first radio communication information corresponding to the latest radio wave propagation environment recorded in advance and the acquired second radio communication information. In this way, the locating apparatus 10 can locate the mobile terminal 30 (a locating target) present in the space with accuracy even if the radio wave propagation environment is subject to change as a result of some obstacles having moved or the like within the space.

The details described in the above embodiment are given by way of example for embodying the technique according to the present invention, and do not confine the technical scope of the present invention. The technical details according to the present invention can be modified in various ways within the scope set forth in the scope of claims. The following explanation will be made using Modified Embodiments 1 to 14 of this embodiment.

Modified Embodiment 1

For example, in the above embodiment, the first radio communication information acquirer 11a of the locating apparatus 10 periodically acquires the first radio communication information (information representing the received electric field intensity) of each installed device and updates the first radio communication information contained in the radio communication data 12b recorded on the storage 12 for dealing with the latest radio wave propagation environment. The present invention is not confined thereto.

For example, the first radio communication information can be updated in another timely manner. For example, the first radio communication information acquirer 11a can acquire the first radio communication information of each installed device 20 and update the first radio communication information 12b recorded on the storage 12 as the installed device information and installed device ID stored on the storage 12 is added or deleted through operation by the operator. More specifically, the first radio communication information acquirer 11a can acquire the radio communication data 12b containing the first radio communication information and record the acquired radio communication data 12b on the storage 12 when information on the installed device 20 (the installed device information and installed device ID) is recorded on the storage 12 for the first time through operation by the operator.

Modified Embodiment 2

In the above embodiment, the locating apparatus 10 identifies the installed device 20 near the mobile terminal 30. The locating apparatus 10 can locate the mobile terminal 30 instead of identifying an installed device. In such a case, for example, the operator associates the installed device information and installed device ID of an installed device 20 with location information of the installed device 20 in the space S and records them on the storage 12 of the locating apparatus 10. The location information is represented by, for example, two-dimensional coordinates (XY coordinates) or three-dimensional coordinates (XYZ coordinates), an area obtained by dividing the space S under a given rule, or the like. The nearby installed device detector 11*c* identifies the location of the locating-target mobile terminal 30 with the location of the installed device 20 in the space, not with the installed device near the mobile terminal 30.

More specifically, when the location of an installed device 20 is represented by coordinates, for example, the locating apparatus 10 acquires an image of the entire room two-dimensionally or three-dimensionally photographed by a camera installed at a given location of the room (which corresponds to the space S). The locating apparatus 10 displays the acquired entire room image on the screen of a display device. Viewing the displayed image, the operator specifies a displayed installed device 20 with a displayed pointer (such as the mouse cursor) using an operation portion (such as the mouse) and enters installed device information and an installed device ID. The locating apparatus 10 acquires the two-dimensional coordinate values or three-dimensional coordinate values of the specified location, associates the acquired coordinate values with the entered installed device information and installed device ID, and records them on the storage 12. Then, the nearby installed device detector 11*c* can locate the mobile terminal 30 using the coordinate values of the installed device 20 near the mobile terminal 30. Here, the locating apparatus 10 determines (monitors) whether the installation location of any installed device 20 is changed (in other words, any installed device 20 has moved) based on the successively captured entire room images. If the installation location of any installed device 20 has changed, the locating apparatus 10 updates the location information (two-dimensional coordinate values or three-dimensional coordinate values) recorded on the storage 12 in association with that installed device 20 to the changed location information.

Also in the case of representing the location information of installed devices 20 by the areas, the locating apparatus 10 can execute similarly operation. In other words, the locating apparatus 10 divides an image of the entire room (which corresponds to the space S) into given areas (for example, 5 lengthwise and 4 crosswise to divide the entire image into 20 areas). The locating apparatus 10 identifies the area corresponding to the image position specified by the operator operating the locating apparatus 10 and records the identified area on the storage 12 in association with the installed device information and installed device ID. Then, the nearby installed device detector 11*c* can present the location of the locating-target mobile terminal 30 by the area to which the installed device 20 near the mobile terminal 30 belongs. Here, the locating apparatus 10 determines (monitors) whether the installation location of any installed device 20 has changed (in other words, any installed device 20 has moved) based on the entire room images successively captured by the camera as in the above case. If the installation location of any installed device 20 in the image has changed, the locating apparatus 10 can update the location information (the area) recorded on the storage 12 in association with the installed device 20 to the changed location information.

Modified Embodiment 3

Furthermore, in the above embodiment, the first radio communication information acquirer 11*a* acquires the received electric field intensity obtained for each pair of installed devices 20 (a transmitting device 20 and a receiving device 20) as the first radio communication information. The present invention is not confined thereto. For example, when an installed device 20 installed in the space S (for example, the installed device 20$_2$ shown in FIG. 1) receives radio signals from another installed device 20 right above the mobile terminal 30 (for example, the installed device 20$_1$ shown in FIG. 1) and the mobile terminal 30, respectively, the electric field intensities of the radio signals are different from each other. Then, in consideration of the difference in height between where the installed device 20 is and where the mobile terminal 30 is, the received electric field intensity obtained for each pair of installed devices 20 (a transmitting device 20 and a receiving device 20) is corrected to the received electric field intensity that will be obtained in radio communication at the height of the mobile terminal 30 being present, and the corrected received electric field intensity can be acquired as the first radio communication information.

An example of correcting the received electric field intensity in consideration of the difference in height between where the installed device 20 is and where the mobile terminal 30 is will be described hereafter. Assuming that the distance between an installed device 20 transmitting radio signals (for example, the installed device 20$_1$ shown in FIG. 1) and an installed device 20 receiving the radio signals (for example, the installed device 20$_2$ shown in FIG. 1) is d and the difference in height between the installed device 20 transmitting radio signals and the mobile terminal 30 is h, the distance d' between the installed devices 20 if the installed device 20 transmitting radio signals is installed at the height of the mobile terminal 30 being present is calculated by the formula below using the theorem of three squares:

$$d' = \sqrt{d^2 + h^2} \quad \text{[Formula 1]}$$

The distance d between the installed devices 20 can be the measurement measured by the person who has installed the installed devices 20 or calculated based on the above-described location coordinates of the installed devices 20. Furthermore, the distance d between the installed devices 20 can be calculated based on the electric field intensity obtained in radio communication provided that it is under the circumstances in which there is no obstacle, namely there is no influence of multipath fading. Therefore, the distance d can be calculated based on the electric field intensity obtained in radio communication under the circumstances in which there is no obstacle. Furthermore, the height difference h between the installed device 20 and mobile terminal 30 is obtained as the difference (h=h$_1$−h$_2$) in which h$_1$ is the height of the installed device 20 and h$_2$ is the height at which the mobile terminal 30 is carried. The height h$_1$ of the installed device 20 can be, for example, the measurement measured by the person who has installed the installed devices 20, or calculated based on the above-described location coordinates of the installed devices 20. Furthermore, the height h$_2$ at which the mobile terminal 30 is carried is, for example, a value estimated based on the average height of ordinary male adults. Therefore, the height h$_2$ may be different from the height at which the mobile terminal 30 is actually present in some case.

It is generally known that the electric field intensity varies in inverse proportion to the square of the line-of-site distance except for very short distances. Therefore, the correction coefficient C for correcting the received electric field intensity to that if the installed device 20 transmitting radio signals is installed at the height of the mobile terminal 30 being present is calculated by the formula below:

$$\frac{d^2}{d'^2} = C \quad \text{[Formula 2]}$$

The correction coefficient C is obtained for each pair of installed devices 20 (a transmitting device 20 and a receiving device 20). As shown in FIG. 15, the correction coefficient C is recorded on the storage 12 as part of the radio communication data 12b in association with the received electric field intensity (the first radio communication information) E obtained for each pair. Then, the received electric field intensity E' that will be obtained in radio communication at the height of the mobile terminal 30 being present is calculated by multiplying the received electric field intensity E obtained in radio communication between the installed devices 20 by the correction coefficient C (namely, E'=E×C). In this way, the first radio communication information acquirer 11a corrects the received electric field intensity E obtained for each pair of installed devices 20 (a transmitting device 20 and a receiving device 20) to acquire the corrected received electric field intensity E' as the first radio communication information. Then, the installed device 20 near the mobile terminal 30 can be identified with accuracy even if the installed devices 20 and mobile terminal 30 are present at different heights.

Modified Embodiment 4

Furthermore, in the above embodiment, the locating apparatus 10 identifies the installed device 20 near the mobile terminal 30. The present invention is not confined thereto. For example, the locating apparatus 10 can output the degree of similarity indicating the magnitude of distance (the degree of nearness) of the locating-target terminal (the mobile terminal 30) to each installed device 20 to the display or the like as the results of locating the mobile terminal 30.

More specifically, as shown in FIG. 16, the evaluation values calculated by the nearby installed device detector 11c in the above embodiment for evaluation as to whether the received electric field intensities are equal to each other are classified into given ranges of evaluation values in advance, and a correspondence table associating the classified evaluation values with the degrees of similarity is recorded on the storage 12 or the like in advance. The locating apparatus 10 (nearby installed device detector 11c) makes reference to the correspondence table recorded on the storage 12 or the like to acquire the degree of similarity corresponding to the evaluation value calculated for each installed device 20 (installed device ID). Then, the locating apparatus 10 can output the degree of similarity acquired for each installed device 20 (a pair of an installed device 20 and a degree of similarity) to the display or the like. The operator of the locating apparatus 10 or the user of the mobile terminal 30 can easily identify the installed device 20 near the mobile terminal 30 by checking on the degree of similarity of each installed device 20.

Modified Embodiment 5

Furthermore, it is also possible to calculate the weighted average of the location information (coordinates or area) of each installed device 20 using the evaluation value or degree of similarity obtained for each installed device 20 as the weight, and identify the calculated location information (coordinates or area) as the location of the mobile terminal 30 in the space S. In this way, the mobile terminal 30 can be located in the space S with accuracy.

Modified Embodiment 6

Furthermore, in the above embodiment, the locating apparatus 10 (nearby installed device detector 11c) locates the mobile terminal 30 and then designates the installed device 20 near the mobile terminal 30 as the control target. The present invention is not confined thereto. For example, the locating apparatus 10 can locate the mobile terminal 30 and then select a control target installed device 20 based on the identified location of the mobile terminal 30 (the installed device 20 near the mobile terminal 30 in the embodiment). The locating apparatus 10 (nearby installed device detector 11c) can also execute given control on the selected installed device 20 or make a provision to the mobile terminal 30 based on the identified location of the mobile terminal 30.

Modified Embodiment 7

Furthermore, any one of multiple installed devices 20 installed in the space S may comprise the configurations of the locating apparatus 10 as appropriate. In such a case, the installed device 20 comprising the configurations of the locating apparatus 10 as appropriate can be used to locate the mobile terminal 30.

Modified Embodiment 8

Furthermore, the mobile terminal 30 may comprise the configurations of the locating apparatus 10 as appropriate. In such a case, the mobile terminal 30 can locate itself.

Modified Embodiment 9

Furthermore, in the above embodiment, the locating apparatus 10 (nearby installed device detector 11c) uses the radio communication data 12b that is updated at given times (in a given cycle or upon addition, deletion, or the like) for locating the mobile terminal 30. The present invention is not confined thereto. For example, in general, obstacles in a space S are often similarly situated at the same date/time, in the same time window, and/or on the same day of the week. Then, it is possible to include information on the date/time, time window, day of the week, or the like in the radio communication data 12b, and make records on the storage 12 on the basis of information on the date/time, time window, day of the week, or the like included in the radio communication data 12b. Then, the locating apparatus 10 (nearby installed device detector 11c) can locate the mobile terminal 30 using the radio communication data 12b of the same date/time, time window, day of the week, or the like as that of the mobile terminal 30 being located, whereby the mobile terminal 30 can be located in the space S with accuracy.

Modified Embodiment 10

Furthermore, in the above embodiment, the locating-target terminal 30 is a terminal 30 moving in a space S by way of example. However, the locating-target terminal 30 can be any terminal. For example, the terminal 30 can be a permanently-installed one.

Furthermore, the terminal 30 may comprise the functions of various kinds of sensors (such as a temperature sensor, humidity sensor, airflow rate sensor, brightness sensor, or $CO_2$ concentration sensor). In such a case, the locating apparatus 10 can control the installed device 20 near the terminal 30 based on the various pieces of environmental information such as the temperature, humidity, airflow rate, brightness, or $CO_2$ concentration acquired from the terminal 30.

More specifically, the locating apparatus 10 identifies the installed device 20 near the locating-target terminal 30, and associates and records information representing the terminal 30 (for example, the terminal ID) and information representing the identified installed device 20 (for example, the installed device ID) on the storage 12. Then, the terminal 30 is registered as a sensor terminal of the installed device 20. In other words, when the installed device 20 near the terminal 30 is an air conditioner, the terminal 30 serves as a sensor terminal used for controlling the air conditioner, and when the installed device 20 near the terminal 30 is a lighting apparatus, the terminal 30 severs as a sensor terminal for controlling the lighting apparatus. Then, the terminal 30 detects various pieces of environmental information through various sensors at given times and sends sensor data representing the detected various pieces of environmental information to the locating apparatus 10. Furthermore, the terminal 30 sends setting data representing various pieces of setting information such as a set temperature, set humidity, and set brightness entered through operation by the user or the like to the locating apparatus 10. The locating apparatus 10 sends to the terminal 30 control information created based on the various pieces of environmental information and various pieces of setting information represented by the data sent from the terminal 30. The terminal 30 controls the various elements 25 shown in FIG. 3 according to the control information received from the locating apparatus 10.

Modified Embodiment 11

Furthermore, in the above embodiment, the first radio communication information acquirer 11a requests an installed device 20 (for example, the installed device $20_1$ shown in FIG. 1) to transmit radio signals and acquires the first radio communication information representing the electric field intensity of the signals received by the installed devices 20 (for example, the installed devices $20_2$ to $20_4$ shown in FIG. 1), and the second radio communication information acquirer 11b requests the mobile terminal 30 to transmit radio signals and acquires the second radio communication information representing the electric field intensity of the signals received by the installed devices 20 (for example, the installed devices $20_1$ to $20_4$ shown in FIG. 1). However, the opposite configuration can be used. In other words, it is possible that the first radio communication information acquirer 11a requests an installed device 20 (for example, the installed device $20_1$ shown in FIG. 1) to receive radio signals and acquires the first radio communication information representing the electric field intensity of the signals received from the installed devices 20 (for example, the installed devices $20_2$ to $20_4$ shown in FIG. 1), and the second radio communication information acquirer 11b requests the mobile terminal 30 to receive radio signals and acquires the second radio communication information representing the electric field intensity of the signals received from the installed devices 20 (for example, the installed devices $20_1$ to $20_4$ shown in FIG. 1).

Modified Embodiment 12

Furthermore, in the above embodiment, the first and second physical quantities acquired in radio communication are the electric field intensities. This is not restrictive. For example, the first and second physical quantities can be the radio wave propagation time and/or arriving angle measured in radio communication.

Modified Embodiment 13

Furthermore, the multiple installed devices 20 and mobile terminal 30 may acquire multiple pieces of the above first and second radio communication information through several radio communication operations. Furthermore, using signals of different output levels in multiple radio communication operations, the multiple installed devices 20 and mobile terminal 30 may acquire the first and second radio communication information obtained from signals of different output levels. In such a case, the location detector 11c may determine whether the first and second criteria are satisfied by calculating multiple evaluation values (V) for each installed device 20 and, for example, calculating the average, median, or mode of the multiple evaluation values (V).

The multiple installed devices 20 and mobile terminal 30 may locate the mobile terminal 30 using multiple physical quantities. In such a case, the evaluation values obtained from different physical quantities, respectively, are represented by the physical quantities in different units (electric field intensity, radio wave propagation time, and arriving angle). Then, when multiple physical quantities are used, for example as shown in FIG. 17, correspondence tables each associating the evaluation values regarding a physical quantity with the degrees of similarity corresponding to the evaluation values are recorded on the storage 12 in advance. The nearby installed device detector 11c may locate the mobile terminal 30 by reading the degrees of similarity corresponding to the physical quantities obtained in radio communication from the storage 12, and determining whether the first and second criteria in the above embodiment are satisfied using the value obtained, for example, by adding the read degrees of similarity.

Modified Embodiment 14

Furthermore, in the above embodiment, the multiple installed device 20 and mobile terminal 30 transmit radio signals are of an equal transmission output level for convenience of explanation. However, different transmission output levels may be used. If different transmission output levels are used, the radio signals transmitted from the installed devices 20 and mobile terminal 30 should contain the transmission output level. Furthermore, the locating apparatus 10 should execute some calculation such as multiplication by a constant calculated based on the ratio (rate) obtained from the transmission output levels of radio signals transmitted by the installed devices 20 and mobile terminal 30. Then, even if the terminals transmit radio signals of different transmission output levels, the radio signals can be treated as if they are of an equal level to each other. Then, the locating based on the evaluation values as in the above embodiment is applicable.

The programs 12a, 22a, and 32a in the above embodiment each can be recorded on a portable recording medium or the like. The portable recording medium is, for example, a CD-ROM (Compact Disk Read Only Memory) and the like. Furthermore, the programs 12a, 22a, and 32a each can be installed on the locating apparatus 10, installed devices 20, and mobile terminal 30 via a reading device of various kinds from the portable recording medium. Furthermore, the programs 12a, 22a, and 32a each can be downloaded and installed on the locating apparatus 10, installed devices 20, and mobile terminal 30 via the Internet. Furthermore, the programs 12a, 22a, and 32a can be stored on a storage of the server or the like communicable with the locating apparatus 10, installed devices 20, and mobile terminal 30.

Additionally, the present invention is not confined to the description of the above embodiment and the drawings and modification can be made to the above embodiment and drawings as appropriate.

INDUSTRIAL APPLICABILITY

The locating apparatus, locating method, locating system, and program of the present invention are used for locating a terminal in a given space.

The invention claimed is:

1. A locating apparatus, comprising:
    a first acquirer for acquiring first radio communication information for each of multiple installed devices, the multiple installed devices being installed within a given space and radio-communicating with each other to acquire the first radio communication information representing a first physical quantity obtained for each of the other multiple installed devices;
    a first storage for recording the first radio communication information acquired by the first acquirer for the each of the multiple installed devices;
    a second acquirer for requesting a terminal to be located within the given space and the multiple installed devices to radio-communicate with each other so as to acquire second radio communication information representing a second physical quantity obtained for each pair of the terminal and multiple installed devices; and
    a detector for comparing, for the each of the multiple installed devices, the second physical quantity to the first physical quantity and a given quantity that is obtained when the installed device receives radio signals transmitted therefrom, and determining an installed device for which a comparison result satisfies a predetermined given condition among the multiple installed devices, wherein
    the detector calculates an evaluation value representing a degree of equality between the first physical quantity and the second physical quantity and the given quantity for each of the multiple installed devices using a given formula, and determines the installed device from which the first physical quantity and the given quantity close to the second physical quantity is obtained among the multiple installed devices based on the calculated evaluation value.

2. The locating apparatus according to claim 1, wherein the detector selects the evaluation value indicating that the first physical quantity and the given quantity are closest to the second physical quantity among the evaluation values calculated for each of the multiple installed devices, and determines the installed device for which the selected evaluation value is calculated based on whether the selected evaluation value satisfies a first criterion.

3. The locating apparatus according to claim 1, wherein the detector determines that the terminal is not located near the multiple installed devices based on whether the selected evaluation value satisfies a second criterion.

4. The locating apparatus according to claim 1, wherein the detector selects a given number of evaluation values in descending order of evaluation indicating that the first physical quantity and the given quantity are close to the second physical quantity, determines the multiple installed devices for which the given number of selected evaluation values are calculated, and determines that the terminal is located near the determined multiple installed devices.

5. The locating apparatus according to claim 1, wherein the physical quantities represented by the first and second radio communication information include any of an electric field intensity, a propagation time, or an arriving angle.

6. The locating apparatus according to claim 1, comprising a control information storage for recording control information that is information for controlling the multiple installed devices for each of the multiple installed devices, wherein:
    the detector acquires the control information corresponding to the determined installed device from the control information storage and controls the determined installed device according to the acquired control information.

7. The locating apparatus according to claim 1, comprising a provisioning information storage for recording provisioning information that is information to be provided to the terminal for each of the multiple installed devices, wherein:
    the detector acquires the provisioning information corresponding to the determined installed device from the provisioning information storage and provides the acquired provisioning information to the determined terminal.

8. The locating apparatus according to claim 1, wherein:
    the first acquirer acquires the first radio communication information at given times for each of the multiple installed devices, and the first storage updates/records the first radio communication information acquired by the first acquirer for each of the multiple installed devices.

9. A locating method, comprising:
    a first acquisition step of acquiring first radio communication information for each of multiple installed devices, the multiple installed devices being installed within a given space and radio-communicating with each other to acquire the first radio communication information representing a first physical quantity obtained for each of the other multiple installed devices;
    a first storing step of recording the first radio communication information acquired for the each of the multiple installed devices in the first acquisition step;
    a second acquisition step of requesting a terminal to be located within the given space and the multiple installed devices to radio-communicate with each other so as to acquire second radio communication information representing a second physical quantity obtained for each pair of the terminal and multiple installed devices; and
    a detection step of comparing, for the each of the multiple installed devices, the second physical quantity to the first physical quantity and a given quantity that is obtained when the installed device receives radio signals transmitted therefrom, and determining an installed device for which a comparison result satisfies a predetermined given condition among the multiple installed devices, wherein
    the detection step further comprises calculating an evaluation value representing a degree of equality between the first physical quantity and the second physical quantity and the given quantity for each of the multiple installed devices using a given formula, and determining the installed device from which the first physical quantity and the given quantity close to the second physical quantity is obtained among the multiple installed devices based on the calculated evaluation value.

10. A locating system, comprising:
    multiple installed devices installed within a given space and radio-communicating with each other to acquire first radio communication information representing a first physical quantity obtained for each of the other multiple installed devices;
    a terminal to be located within the given space;
    a first acquirer for acquiring the first radio communication information from each of the multiple installed devices;

a first storage for recording the first radio communication information acquired by the first acquirer for the each of the multiple installed devices;

a second acquirer for requesting the terminal and multiple installed devices to radio-communicate with each other so as to acquire second radio communication information representing a second physical quantity obtained for each pair of the terminal and multiple installed devices; and a detector for comparing, for the each of the multiple installed devices, the second physical quantity to the first physical quantity and a given quantity that is obtained when the installed device receives radio signals transmitted therefrom, and determining an installed device for which a comparison result satisfies a predetermined given condition among the multiple installed devices, wherein the detector calculates an evaluation value representing a degree of equality between the first physical quantity and the second physical quantity and the given quantity for each of the multiple installed devices using a given formula, and determines the installed device from which the first physical quantity and the given quantity close to the second physical quantity is obtained among the multiple installed devices based on the calculated evaluation value.

11. A non-transitory computer-readable recording medium comprising a program allowing a computer to execute:

a first acquisition step of acquiring first radio communication information for each of multiple installed devices, the multiple installed devices being installed within a given space and radio-communicating with each other to acquire the first radio communication information representing a first physical quantity obtained for each of the other multiple installed devices;

a first storing step of recording the first radio communication information acquired for the each of the multiple installed devices in the first acquisition step;

a second acquisition step of requesting a terminal to be located within the given space and the multiple installed devices to radio-communicate with each other so as to acquire second radio communication information representing a second physical quantity obtained for each pair of the terminal and multiple installed devices; and a detection step of comparing, for the each of the multiple installed devices, the second physical quantity to the first physical quantity and a given quantity that is obtained when the installed device receives radio signals transmitted therefrom, and determining an installed device for which a comparison result satisfies a predetermined given condition among the multiple installed devices, wherein the detection step further comprises calculating an evaluation value representing a degree of equality between the first physical quantity and the second physical quantity and the given quantity for each of the multiple installed devices using a given formula, and determining the installed device from which the first physical quantity and the given quantity close to the second physical quantity is obtained among the multiple installed devices based on the calculated evaluation value.

* * * * *